(12) United States Patent
Lu

(10) Patent No.: US 9,457,724 B2
(45) Date of Patent: Oct. 4, 2016

(54) CARGO COVER ASSEMBLIES AND VEHICLES INCORPORATING THE SAME

(71) Applicant: Toyota Motor Engineering & Manufacturing North America, Inc., Erlanger, KY (US)

(72) Inventor: Norman N. Lu, Canton, MI (US)

(73) Assignee: Toyota Motor Engineering & Manufacturing North America Inc., Erlanger, KY (US)

( * ) Notice: Subject to any disclaimer, the term of this patent is extended or adjusted under 35 U.S.C. 154(b) by 18 days.

(21) Appl. No.: 14/469,075

(22) Filed: Aug. 26, 2014

(65) Prior Publication Data

US 2016/0059788 A1    Mar. 3, 2016

(51) Int. Cl.
  *B60R 5/04*   (2006.01)
  *B60N 2/36*   (2006.01)
  *B60N 2/30*   (2006.01)

(52) U.S. Cl.
  CPC ............. *B60R 5/045* (2013.01); *B60N 2/3011* (2013.01); *B60N 2/3065* (2013.01); *B60N 2/3079* (2013.01); *B60N 2/36* (2013.01); *B60R 5/04* (2013.01)

(58) Field of Classification Search
  CPC ....... B60R 5/045; B60R 5/04; B60N 2/3079; B60N 2/36; B60N 2/3011; B60N 2/3065
  See application file for complete search history.

(56) References Cited

U.S. PATENT DOCUMENTS

| | | | |
|---|---|---|---|
| 6,729,668 B2 | 5/2004 | Maibom | |
| 7,059,646 B1 | 6/2006 | DeLong | |
| 7,216,916 B2 | 5/2007 | Czerwinski | |
| 7,661,742 B2 | 2/2010 | Medlar | |
| 8,439,419 B2 | 5/2013 | Zuelch | |
| 8,505,999 B2 | 8/2013 | Whalen | |
| 2009/0108639 A1* | 4/2009 | Sturt | B60N 2/22 297/15 |
| 2011/0080027 A1* | 4/2011 | Nakao | B60N 2/01583 297/311 |

* cited by examiner

*Primary Examiner* — Glenn Dayoan
*Assistant Examiner* — Melissa A Black
(74) *Attorney, Agent, or Firm* — Dinsmore & Shohl LLP

(57) ABSTRACT

A vehicle cargo assembly including a vehicle floor having a top surface and a storage compartment having an opening at the top surface of the vehicle floor and extending below the top surface of the vehicle floor. A vehicle seat includes a back portion pivotably coupled to a bench portion at a seat folding location. A cargo cover is coupled to the vehicle seat and is pivotable between a seat upright extended position and a seat upright retracted position. When the cargo cover is in the seat upright extended position, the cargo cover covers the opening of the storage compartment.

20 Claims, 5 Drawing Sheets

CARGO COVER ASSEMBLIES AND VEHICLES INCORPORATING THE SAME

TECHNICAL FIELD

The present specification generally relates to vehicles having cargo cover assemblies and, more particularly, to vehicles having cargo covers coupled to vehicle seats and engageable with storage compartments.

BACKGROUND

Cargo carrying locations may be positioned throughout a vehicle to provide storage locations for a user to place items. For example, cargo carrying locations may be positioned in the rear of the vehicle or near one or more vehicle seats. However, cargo carrying locations can be unsecured and visible from the windows of a vehicle. Further, cargo carrying locations may be located in the limited space within the cabin of the vehicle, for example, behind or between the vehicle seats.

Accordingly, there is a desire for vehicle cargo assemblies that can securely cover a storage compartment and provide a user with a secured storage compartment extending into the floor of a vehicle.

SUMMARY

In one embodiment, a vehicle cargo assembly includes a vehicle floor having a top surface and a storage compartment having an opening at the top surface of the vehicle floor and extending below the top surface of the vehicle floor. A vehicle seat includes a back portion pivotably coupled to a bench portion at a seat folding location. A cargo cover is coupled to the vehicle seat and is pivotable between a seat upright extended position and a seat upright retracted position. When the cargo cover is in the seat upright extended position, the cargo cover covers the opening of the storage compartment.

In another embodiment, a vehicle cargo assembly includes a vehicle floor having a top surface and a storage compartment having an opening at the top surface of the vehicle floor and extending below the top surface of the vehicle floor. A vehicle seat includes a back portion pivotably coupled to a bench portion at a seat folding location. One or more seat legs extend between the bench portion and a storage compartment floor, the one or more seat legs pivotably coupled to the bench portion and pivotably coupled to the storage compartment floor such that the vehicle seat is moveable between an upright position, where the vehicle seat is positioned adjacent the storage compartment, and a stored position, where the vehicle seat is positioned within the storage compartment. A cargo cover is coupled to the vehicle seat and is pivotable between a seat upright extended position and a seat upright retracted position when the vehicle seat is positioned in the upright position. The cargo cover covers the opening of the storage compartment when positioned in the seat upright extended position and the cargo cover is positioned along the back portion of the vehicle seat when positioned in the seat upright retracted position.

In yet another embodiment, a vehicle cargo assembly includes a cargo cover pivotably coupled to a vehicle seat using an extendable hinge and a storage compartment having an opening at the top surface of the vehicle floor and extending below the top surface of the vehicle floor. The storage compartment is positioned behind the vehicle seat when the vehicle seat is in an upright position and includes a locking surface engageable with the cargo cover. The cargo cover is pivotable between a seat upright retracted position and a seat upright extended position when the vehicle seat is in the upright position. When the cargo cover is in the seat upright extended position the cargo cover covers an opening of the storage compartment and extends in a plane of the vehicle floor. The vehicle seat is foldable into a stored position within the storage compartment. The cargo cover is pivotable between a seat stored retracted position and a seat stored extended position when the vehicle seat is in the stored position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to vehicles having cargo cover assemblies. The cargo cover assemblies may include one or more cargo covers pivotably coupled to one or more vehicle seats positioned adjacent to one or more storage compartments. The one or more vehicle seats include a back portion pivotably coupled to a bench portion. The cargo cover can be pivotably coupled to the back portion of the vehicle seat and pivotable between a seat upright extended position and a seat upright retracted position. When the cargo cover is in the seat upright extended position, the cargo cover can cover an opening of the storage compartment positioned along a vehicle floor. When the cargo cover is in the seat upright retracted position, the cargo cover can be positioned along the back portion of the vehicle seat. The cargo cover can be lockable in either of the seat upright extended position or the seat upright retracted position.

Figure 1:
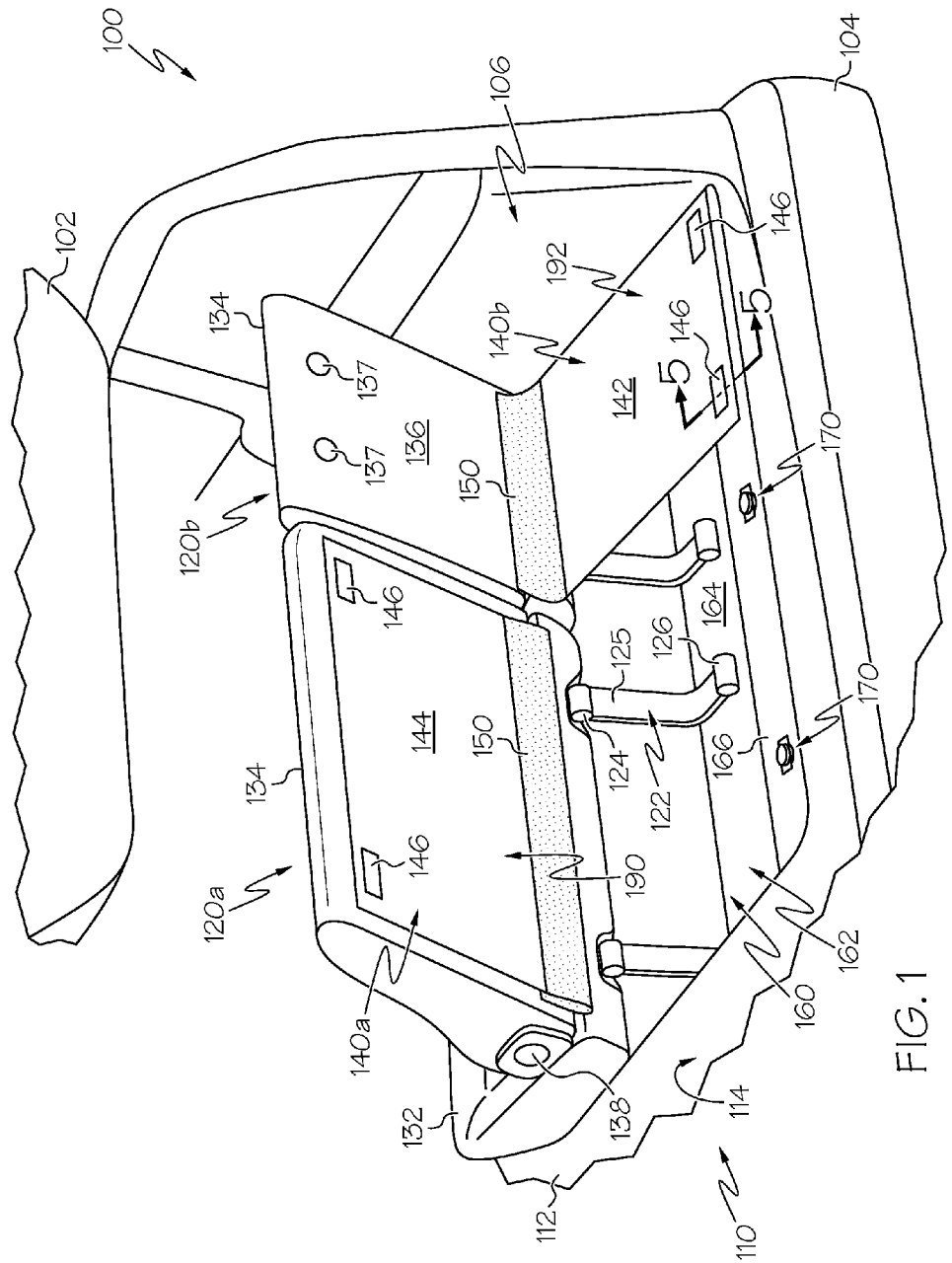
FIG. 1 depicts a partial perspective view of a vehicle having a vehicle cargo assembly according to one or more embodiments described herein.

Referring now to FIG. 1, a partial perspective view of a vehicle 100 including a vehicle cargo assembly 110 is depicted. The vehicle cargo assembly 110 depicted in FIG. 1 includes two vehicle seats 120a and 120b. While two vehicle seats 120a and 120b are depicted, it should be understood that any number of vehicle seats 120 are contemplated, for example, one vehicle seat, three vehicle seats, or more. The vehicle seats 120*a*, 120*b* depicted are third row fold flat seats. It should be understood that the present disclosure may include any type of vehicle seat, including front seats, bucket seats, bench seats, first row seats, second row seats, third row seats, and the like. The vehicle seats 120*a*, 120*b* may be positioned adjacent to a storage compartment 160 such that the storage compartment 160 is positioned between the vehicle seats 120*a*, 120*b* and a back door 102 and bumper 104 of the vehicle 100. As depicted in FIG. 1, the storage compartment 160 may comprise a storage compartment opening 162 and may extend below a top surface 114 of a vehicle floor 112. Further, the storage compartment 160 may be positioned within the rear storage area 106 of the vehicle 100.

Referring still to FIG. 1, each vehicle seat 120*a*, 120*b* includes a back portion 134 pivotably coupled to a bench portion 132 at a seat folding location 138. In some embodiments, the vehicle seats 120*a*, 120*b* further include a headrest coupled to the back portion 134. The vehicle seats 120*a*, 120*b* are coupled to the vehicle 100 using one or more seat legs 122. In some embodiments, the seat legs 122 may extend between the top surface 114 of the vehicle floor 112 and the bench portion 132 of the vehicle seat 120. In other embodiments, the seat legs 122 extend below the vehicle floor 112, for example, between the bench portion 132 and a storage compartment floor 164. In some embodiments, the bench portion 132 can be positioned above and along the top surface 114 of the vehicle floor 112.

The vehicle cargo assembly 110 depicted in FIG. 1 further includes two cargo covers 140*a* and 140*b*. A first cargo cover 140*a* is pivotably coupled to the first vehicle seat 120*a* and a second cargo cover 140*b* is pivotably coupled to the second vehicle seat 120*b*. As described in greater detail below, each cargo cover 140*a*, 140*b* can be pivoted between a seat upright retracted position 190 where a seat-facing surface 142 is located nearer the back portion 134 of the vehicle seat 120*a*, 120*b*, and a seat upright extended position 192 where a seat-facing surface 142 is located farther from the back portion 134 of the vehicle seat 120*a*, 120*b*. In FIG. 1, the first cargo cover 140*a* is in the seat upright retracted position 190 and the second cargo cover 140*b* is in the seat upright extended position 192. It should be understood that while two cargo covers 140*a*, 140*b* are depicted in FIG. 1, any number of cargo covers 140 are contemplated. An individual cargo cover 140 can be pivotably coupled to a single vehicle seat 120 or pivotably coupled to multiple vehicle seats 120, for example, a row of vehicle seats 120. In some embodiments, multiple cargo covers 140 are pivotably coupled to an individual vehicle seat 120, for example, two cargo covers 140 pivotably coupled to a single, bench-style, third row vehicle seat 120.

Referring still to FIG. 1, when each cargo cover 140*a* and 140*b* is positioned in the seat upright extended position 192 each cargo cover 140*a* and 140*b* covers a portion of the storage compartment opening 162. Further, when both cargo covers 140*a*, 140*b* are in the seat upright extended position 192, the storage compartment opening 162 is fully covered. In other embodiments, a single cargo cover 140 can be pivotably coupled to one or more vehicle seats 120 such that the single cargo cover 140 can cover the storage compartment opening 162 when in the seat upright extended position 192. Other embodiments include multiple storage compartments 160. In these embodiments, each individual storage compartment 160 can be covered by an individual or multiple cargo covers 140.

Figure 2:
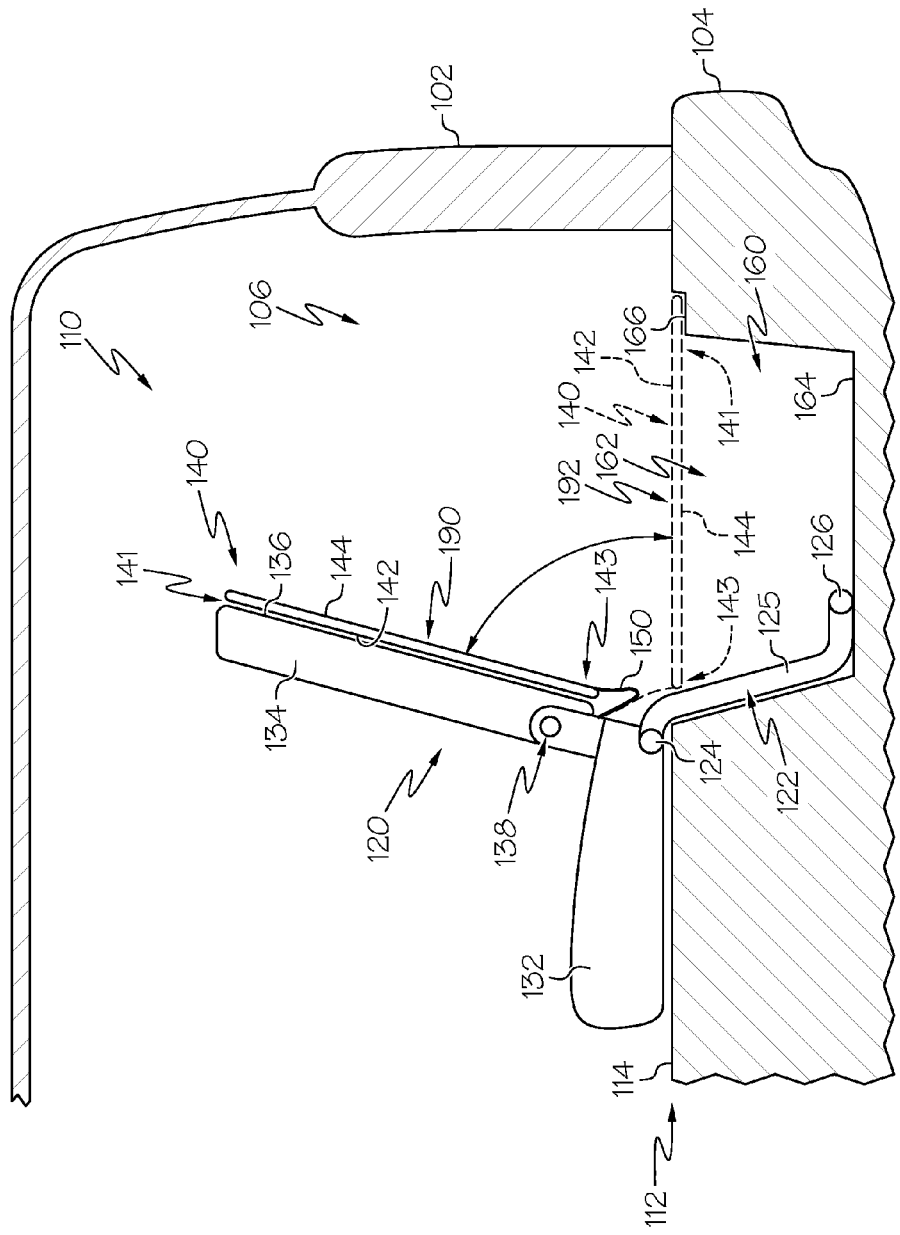
FIG. 2 depicts a vehicle cargo assembly including vehicle seat having a cargo cover according to one or more embodiments described herein.

Referring also to FIG. 2, a side view of the vehicle cargo assembly 110 is depicted including the cargo cover 140 pivotably coupled to the vehicle seat 120. The cargo cover 140 may comprise a hard plastic material, a metal material, or the like. The cargo cover 140 includes a seat-facing surface 142, a rear-facing surface 144, a swinging end 141, a pivoting end 143, and one or more locking regions 146 (FIG. 1). The one or more locking regions 146 may be holes positioned at the swinging end 141 of the cargo cover 140 and may be a variety of shapes, such as, for example, rectangular, squared, rounded, circular, or the like, as described in more detail below.

In some embodiments, the cargo cover 140 is pivotably coupled to the vehicle seat 120 using an extendable hinge 150. The extendable hinge 150 extends between the vehicle seat 120 near the seat folding location 138 and is coupled the pivoting end 143 of the cargo cover 140. The extendable hinge 150 may be coupled to the back portion 134, the bench portion 132 of the vehicle seat 120, and/or any other suitable location such as between the back portion 134 and the bench portion 132. The extendable hinge 150 may comprise a foldable material, such as, for example, carpet, fabric, bendable plastic, ropes, linkages, and/or the like. In alternative embodiments, the extendable hinge 150 may comprise a rigid material (for example, having joints and/or bearings). The extendable hinge 150 allows the cargo cover 140 to be positioned above the top surface 114 of the vehicle floor in the seat upright retracted position 190 and positioned along the top surface 114 of the vehicle floor 112 in the seat upright extended position 192. In alternative embodiments, the cargo cover 140 is pivotably coupled to the vehicle seat 120 using a barrel hinge, pivot hinge, or the like.

Referring still to FIGS. 1 and 2, the cargo cover 140 is pivotable between a seat upright retracted position 190 and a seat upright extended position 192. When the cargo cover 140 is in the seat upright retracted position 190, the cargo cover 140 is positioned along the back portion 134 of the vehicle seat 120 such that the seat-facing surface 142 of the cargo cover 140 faces the rear surface 136 of the back portion 134 of the vehicle seat 120. The cargo cover 140 can be held in the seat upright retracted position 190 using a latch 137 coupled to the back portion 134 of the vehicle seat 120. The latch 137 can engage with the cargo cover 140, such as, for example, the one or more locking regions 146 of the cargo cover 140. In other embodiments, the cargo cover 140 can be held in the seat upright retracted position 190 using a frictional engagement, such as a interference fit with a recessed portion of back portion 134 of the vehicle seat 120 or a magnetic engagement between one or more magnets coupled to the back portion 134 of the vehicle seat 120 and one or more metal portions positioned on the cargo cover 140.

When the cargo cover 140 is in the seat upright extended position 192, the cargo cover 140 covers at least a portion of the storage compartment opening 162 and is positioned along vehicle floor 112. In the seat upright extended position 192, at least a portion of the rear-facing surface 144 of the cargo cover 140 is positioned along the locking surface 166 of the storage compartment 160 and the seat-facing surface 142 of the cargo cover 140 is positioned in alignment with the top surface 114 of the vehicle floor 112. In particular, the seat-facing surface 142 of the cargo cover 140 may be positioned in the same plane as the top surface 114 of the vehicle floor 112, for example, flush with the top surface 114. In the seat upright extended position 192, the cargo cover 140 can be positioned below the bench portion 132 of the vehicle seat 120. The extendable hinge 150 allows the pivoting end 143 of the cargo cover 140 to translate in a vehicle downward direction while the pivoting end 143 pivots into the seat upright extended position 192. For example, the pivoting end 143 may be positioned lower in the vehicle downward direction when in the seat upright extended position 192 than when in the seat upright retracted position 190. Further, when the cargo cover 140 is in the seat upright extended position 192, the cargo cover 140 defines a floor of the rear storage area 106 and provides a load-bearing surface covering the storage compartment 160 to allow a user to place items on the cargo cover 140.

Figure 3:
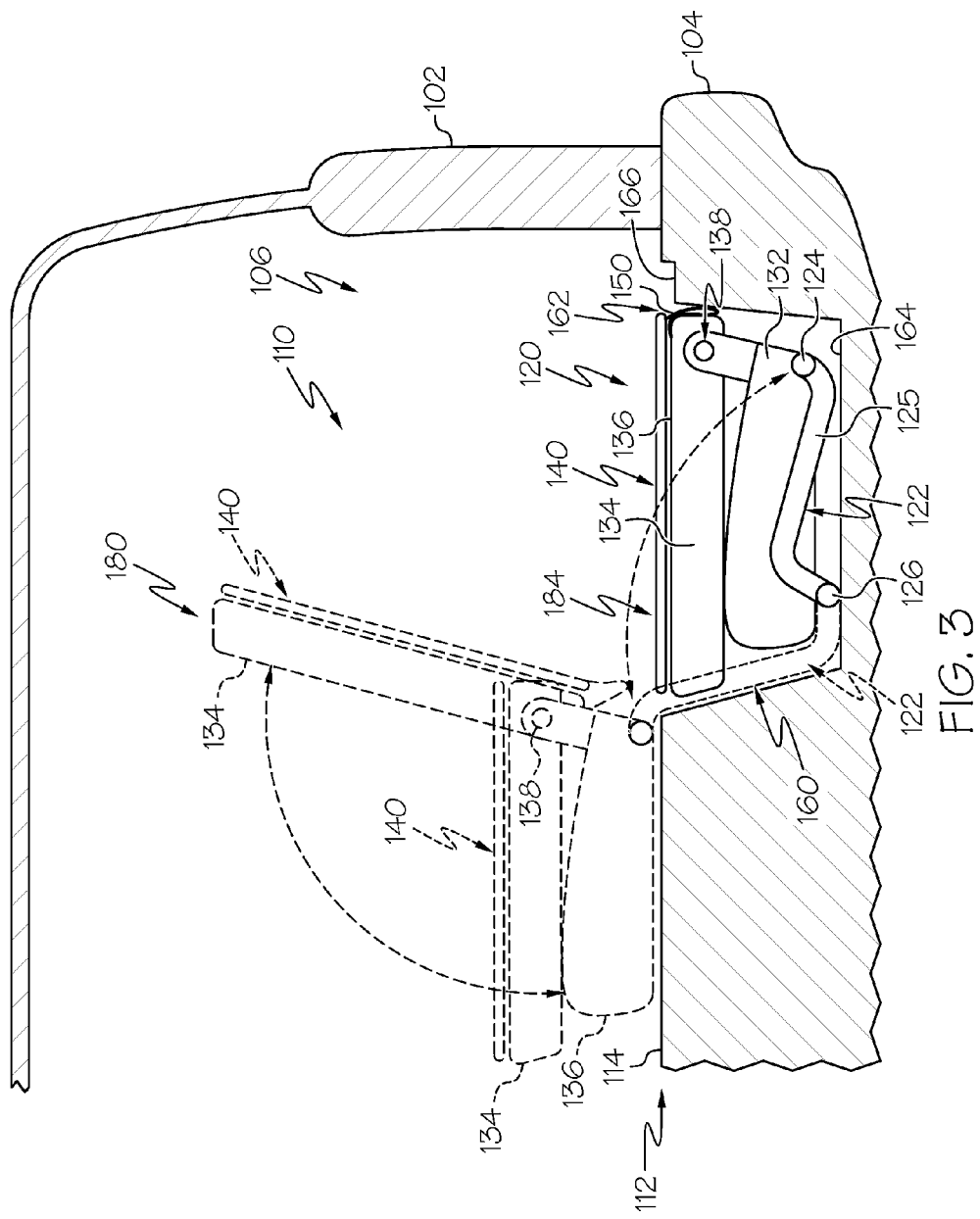
FIG. 3 depicts a vehicle seat foldable into a storage compartment according to one or more embodiments described herein.

Referring now to FIG. 3, an exemplary embodiment of the vehicle seat 120 that can be folded into the storage compartment 160 is depicted. In this embodiment, the seat legs 122 of the vehicle seat 120 extend below the vehicle floor 112, for example, between the bench portion 132 of the vehicle seat 120 and a storage compartment floor 164. The seat legs 122 may further comprise an upper hinge 124, a lower hinge 126, and a central portion 125 disposed therebetween. The seat legs 122 are pivotable to move the vehicle seat 120 between an upright position 180 and a stored position 184. In the upright position 180, the seat legs 122 extend at least to the top surface 114 of the vehicle floor 112 and in some embodiments of the upright position 180, the seat legs 122 extend above the top surface 114 of the vehicle floor 112. In the stored position 184, the seat legs 122 are positioned below the top surface 114 of the vehicle floor 112, within the storage compartment 160. In some embodiments, the back portion 134 of the vehicle seat 120 is folded onto the bench portion 132 of the vehicle seat 120 when the vehicle seat is located in the stored position 184. To pivot the vehicle seat 120 into stored position 184, the upper hinge 124 and the lower hinge 126 pivot the central portion 125 of the seat legs 122 into a position along the storage compartment floor 164 such that the central portion 125 is disposed between the storage compartment floor 164 and the bench portion 132 of the vehicle seat 120. Pivoting the central portion 125 into a positioned along the storage compartment floor 164 moves the vehicle seat 120 into the storage compartment 160. Further, when the back portion 134 is folded into the bench portion 132, the vehicle seat 120 can be positioned below the top surface 114 of the vehicle floor 112.

Figure 4:
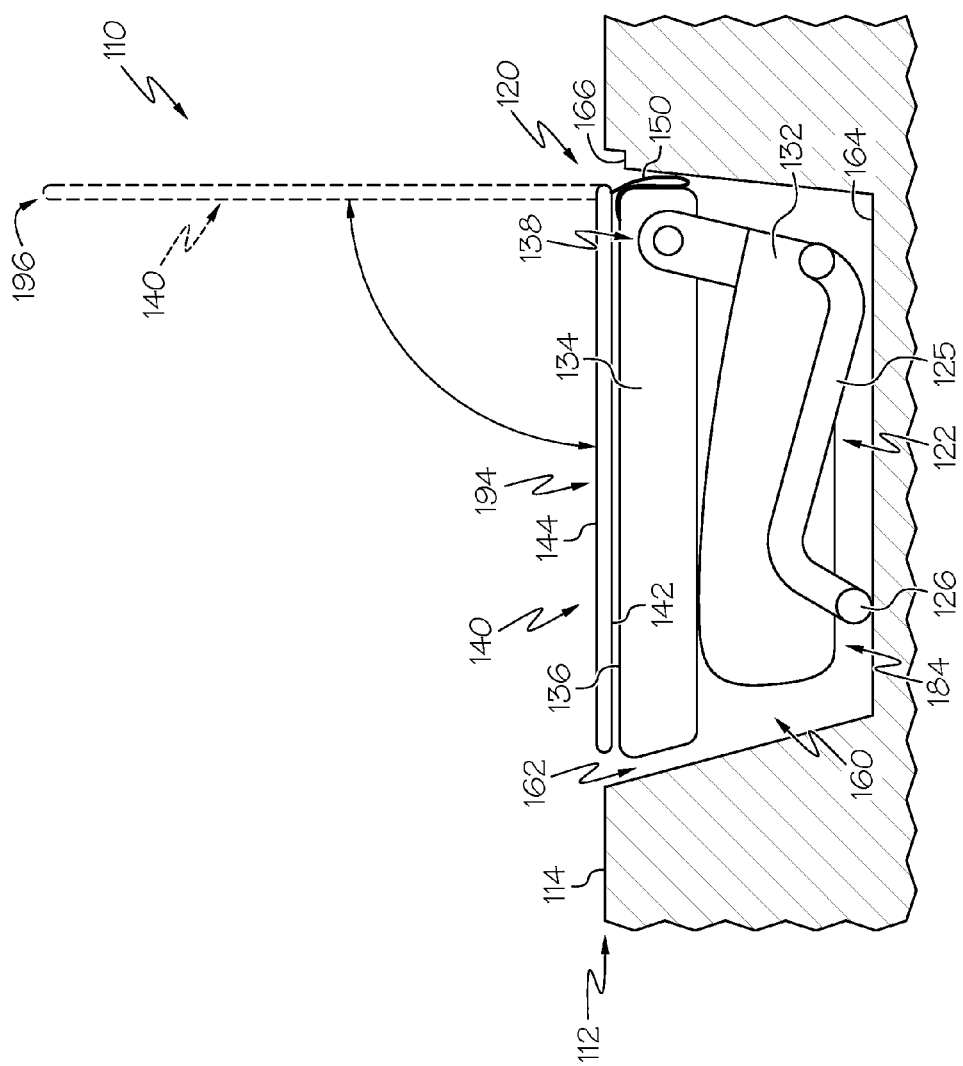
FIG. 4 depicts a vehicle cargo assembly including a vehicle seat having a cargo cover folded into a storage compartment according to one or more embodiments described herein.

Referring now to FIG. 4, the vehicle seat 120 is depicted in the stored position 184 within the storage compartment 160. When the vehicle seat 120 is in the stored position 184, the cargo cover 140 may be pivotable between a seat stored retracted position 194 and a seat stored extended position 196. When the cargo cover 140 is in the seat stored retracted position 194, the cargo cover 140 can define a floor of the rear storage area 106 and may be positioned above the vehicle seat 120, in the vehicle heightwise direction, and along the top surface 114 of the vehicle floor 112. When the cargo cover 140 is in the seat stored extended position 196, the vehicle seat 120 can be uncovered and at least a portion of the cargo cover 140 can be positioned above the vehicle seat 120. In some embodiments, when the cargo cover 140 is in the seat stored retracted position 194, access to the vehicle seat 120 is inhibited such that a user may not be able to pivot the seat into an upright position 180. In some embodiments, the vehicle seat 120 may be able to pivot into the upright position 180 only when the cargo cover 140 is in the seat stored extended position 196. In other embodiments, the vehicle seat 120 may be able to pivot into the upright positioned 180 when the cargo cover is in either the seat stored retracted position 194 or the seat stored extended position 196.

Figure 5:
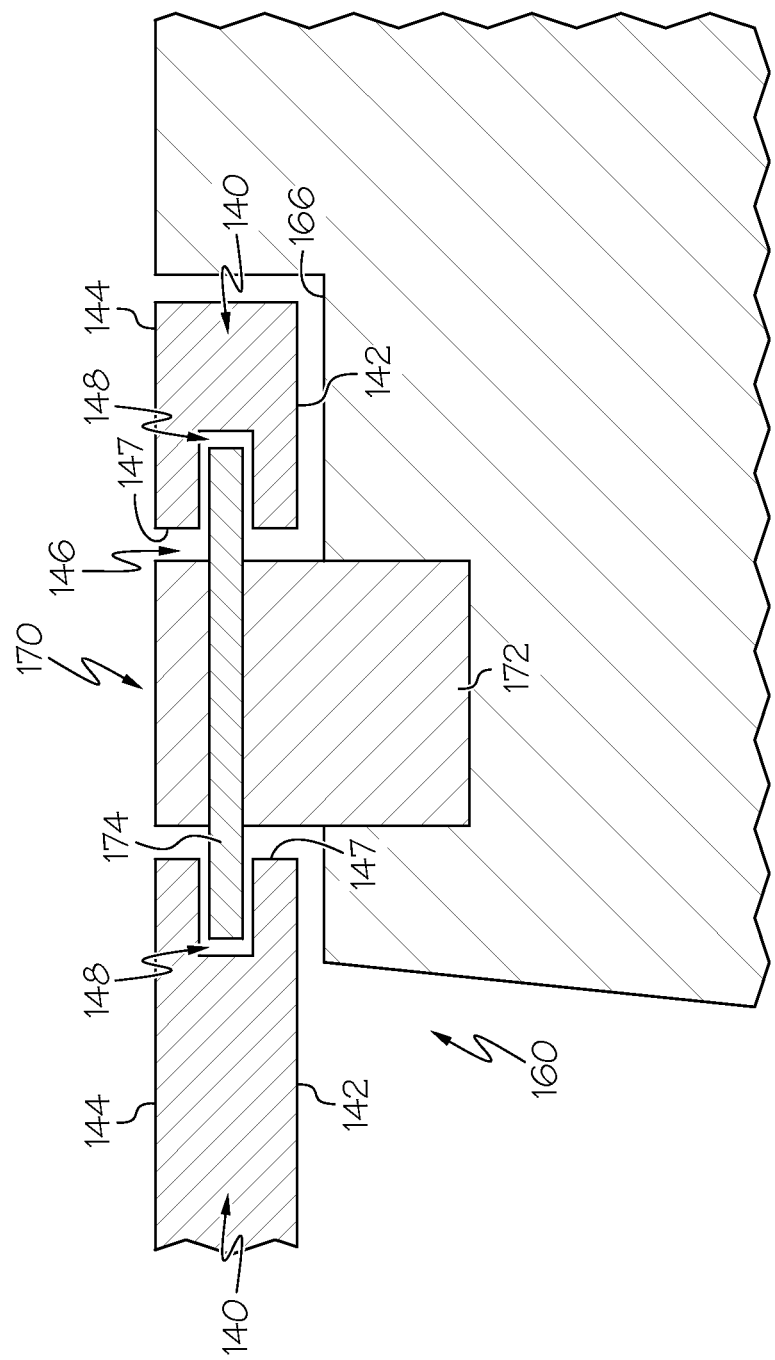
FIG. 5 depicts a locking mechanism of a cargo cover according to one or more embodiments described herein.

Referring now to FIG. 5, a sectional view of the vehicle cargo assembly 110 depicted in FIG. 1, the cargo cover 140 is engageable with the locking surface 166 of the storage compartment 160 using one or more locking mechanisms 170. The one or more locking mechanisms 170 may comprise a locking cylinder 172 coupled to a locking bar 174. As depicted in FIG. 5, an individual locking cylinder 172 is coupled to and extends into the locking surface 166 of the storage compartment 160. The locking mechanism 170 is engageable with an individual locking region 146 of the cargo cover 140 when the cargo cover 140 is in the seat upright extended position 192. In particular, the locking bar 174 of the locking mechanism 170 can be disposed within a slot 148 of the locking region 146, the slot 148 extending into the cargo cover from a perimeter wall 147 of the locking region 146. As described in more detail below, the one or more locking regions 146 can engage with one or more locking mechanisms 170 to lock the cargo cover 140 over the storage compartment 160. Further, in alternative embodiments, the locking mechanism 170 may be coupled to the cargo cover 140. In these embodiments, the locking mechanism 170 may extend from the rear-facing surface 144 of the cargo cover 140 and the locking cylinder 172 can be locked into a recess in the locking surface 166 of the storage compartment 160 when the cargo cover 140 is in the seat upright extended position 192.

In operation, the locking cylinder 172 of the locking mechanism 170 is rotatable within the locking surface 166, for example, by about 90°, allowing the locking bar 174 to engage and disengage with the slot 148 of the locking region 146. Rotating the locking cylinder 172 rotates the locking bar 174 and disposes the locking bar 174 within the slot 148. In some embodiments, the locking mechanism 170 may be a key-locking mechanism, requiring a key to be inserted into the locking mechanism in order to rotate the locking mechanism. This allows a user to store items within the storage compartment 160 that can only be accessed by unlocking the locking mechanism 170 with a key. In other embodiments, the locking mechanism 170 may require an alphanumeric combination to be entered to unlock the locking mechanism. In further embodiments, the locking mechanism 170 may further comprise a fingerprint identification device that can analyze a received fingerprint and unlock the locking mechanism 170 only if the received fingerprint matches a stored user fingerprint. While the locking mechanism is 170 is described having the locking cylinder 172 and the locking bar 174, it should be understood that other types of locking mechanisms are contemplated. For example, the locking mechanism 170 may comprise a fastener mechanism, a mechanism facilitating frictional engagement, a magnetic mechanism, or the like.

It should now be understood that vehicles incorporating vehicle cargo assemblies can include cargo covers pivotably coupled to vehicle seats positioned adjacent storage compartments that extend below a top surface of a vehicle floor. The cargo covers can be pivoted between a seat upright retracted position and a seat upright extended position to optionally cover the storage compartment opening. In the seat upright retracted position, the cargo cover is positioned along the back portion of the vehicle seat. In the seat upright extended position, the cargo cover covers the opening of the storage compartment and is positioned along the top surface of the vehicle floor. In particular, the rear-facing surface of the cargo cover engages with a locking surface of the storage compartment and the seat-facing surface of the cargo cover is aligned with the top surface of the vehicle floor. Further, the vehicle cargo assembly includes an extendable hinge extending between the vehicle seat and the cargo cover. The extendable hinge allows the cargo cover to be positioned above the top surface of the vehicle floor in the seat upright retracted position and along the top surface of the vehicle floor in the seat upright extended position.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle cargo assembly comprising:
   a vehicle floor having a top surface;
   a storage compartment having an opening at the top surface of the vehicle floor and extending below the top surface of the vehicle floor;
   a vehicle seat having a back portion pivotably coupled to a bench portion at a seat folding location; and
   a cargo cover coupled to the vehicle seat and pivotable between a seat upright extended position and a seat upright retracted position, wherein when the cargo cover is in the seat upright extended position the cargo cover covers the opening of the storage compartment and is positioned below a bench portion of the vehicle seat.

2. The vehicle cargo assembly of claim 1, wherein the vehicle seat is moveable between an upright position, wherein the vehicle seat is positioned adjacent to the storage compartment, and a stored position, wherein the vehicle seat is positioned within the storage compartment.

3. The vehicle cargo assembly of claim 2, further comprising one or more seat legs extending between the bench portion and a storage compartment floor, the one or more seat legs pivotably coupled to the bench portion and pivotably coupled to the storage compartment floor such that the vehicle seat can be pivoted between the upright position and the stored position.

4. The vehicle cargo assembly of claim 2, wherein when the vehicle seat is in the stored position, the cargo cover is pivotable between a seat stored retracted position and a seat stored extended position.

5. The vehicle cargo assembly of claim 1, wherein when the cargo cover is in the seat upright extended position, a seat-facing surface of the cargo cover is aligned with the top surface of the vehicle floor.

6. The vehicle cargo assembly of claim 1, wherein when the cargo cover is in the seat upright retracted position, the cargo cover is positioned along the back portion of the vehicle seat.

7. The vehicle cargo assembly of claim 1, wherein the storage compartment further comprises a locking surface engageable with the cargo cover.

8. The vehicle cargo assembly of claim 7 further comprising a locking mechanism coupled to the locking surface of the storage compartment and securely engageable with the cargo cover.

9. The vehicle cargo assembly of claim 1 further comprising an extendable hinge pivotably coupling the cargo cover to the vehicle seat.

10. The vehicle cargo assembly of claim 9, wherein the cargo cover includes a pivoting end and a swinging end wherein the pivoting end is coupled to the extendable hinge.

11. The vehicle cargo assembly of claim 10, wherein the swinging end of the cargo cover is removably attachable to the back portion of the vehicle seat when the cargo cover is in the seat upright retracted position using a fastener engagement, a frictional engagement, or a magnetic engagement.

12. The vehicle cargo assembly of claim 10, wherein the pivoting end of the cargo cover is positioned lower in a vehicle downward direction when positioned in the seat upright extended position than when positioned in the seat upright retracted position.

13. A vehicle cargo assembly comprising:
    a vehicle floor having a top surface;
    a storage compartment having an opening at the top surface of the vehicle floor and extending below the top surface of the vehicle floor;
    a vehicle seat comprising a back portion pivotably coupled to a bench portion at a seat folding location;
    one or more seat legs extending between the bench portion and a storage compartment floor, the one or more seat legs pivotably coupled to the bench portion and pivotably coupled to the storage compartment floor such that the vehicle seat is moveable between an upright position, wherein the vehicle seat is positioned adjacent the storage compartment, and a stored position, wherein the vehicle seat is positioned within the storage compartment; and
    a cargo cover coupled to the vehicle seat and pivotable between a seat upright extended position and a seat upright retracted position when the vehicle seat is positioned in the upright position;
    wherein the cargo cover covers the opening of the storage compartment and is positioned below a bench portion of the vehicle seat when positioned in the seat upright extended position and the cargo cover is positioned along the back portion of the vehicle seat when positioned in the seat upright retracted position.

14. The vehicle cargo assembly of claim 13, wherein the cargo cover is pivotable between a seat stored extended position and a seat stored retracted position when the vehicle seat is positioned in the stored position.

15. The vehicle cargo assembly of claim 13, wherein when the cargo cover is in the seat upright extended position the cargo cover extends in a plane of the vehicle floor.

16. The vehicle cargo assembly of claim 13 further comprising an extendable hinge that pivotably couples the cargo cover to the vehicle seat.

17. The vehicle cargo assembly of claim 16, wherein the cargo cover includes a pivoting end coupled to the extendable hinge, the pivoting end positioned lower in a vehicle downward direction when the cargo cover is in the seat upright extended position than when the cargo cover is in the seat upright retracted position.

18. A vehicle cargo assembly comprising:
    a cargo cover pivotably coupled to a vehicle seat using an extendable hinge; and
    a storage compartment having an opening at a top surface of a vehicle floor and extending below the top surface of the vehicle floor, the storage compartment positioned behind the vehicle seat when the vehicle seat is in an upright position, the storage compartment having a locking surface engageable with the cargo cover;

wherein the cargo cover is pivotable between a seat upright retracted position and a seat upright extended position when the vehicle seat is in the upright position, wherein when the cargo cover is in the seat upright extended position the cargo cover covers the opening of the storage compartment and extends in a plane of the vehicle floor; and wherein the vehicle seat is foldable into a stored position within the storage compartment and the cargo cover is pivotable between a seat stored retracted position and a seat stored extended position when the vehicle seat is in the stored position.

19. The vehicle cargo assembly of claim 18, wherein the vehicle seat further comprises a back portion pivotably coupled to a bench portion at a seat folding location and one or more seat legs extending between the bench portion and a storage compartment floor, the one or more seat legs pivotably coupled to the bench portion and pivotably coupled to the storage compartment floor such that the vehicle seat can be pivoted between the upright position and the stored position.

20. The vehicle cargo assembly of claim 18, wherein the cargo cover includes a pivoting end and a swinging end, wherein the pivoting end is coupled to the extendable hinge and the pivoting end is positioned lower in a vehicle downward direction when positioned in the seat upright extended position than when positioned in the seat upright retracted position.

* * * * *